United States Patent
Kuehlwein et al.

(10) Patent No.: US 7,206,155 B2
(45) Date of Patent: Apr. 17, 2007

(54) HIGH-SPEED, LOW POWER PREAMPLIFIER WRITE DRIVER

(75) Inventors: Jeremy Kuehlwein, Woodbury, MN (US); Raymond E. Barnett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/955,424

(22) Filed: Sep. 30, 2004

(65) Prior Publication Data

US 2005/0094305 A1 May 5, 2005

Related U.S. Application Data

(60) Provisional application No. 60/515,508, filed on Oct. 29, 2003.

(51) Int. Cl.
*G11B 5/02* (2006.01)
(52) U.S. Cl. .................... 360/67; 360/66; 360/68; 360/46
(58) Field of Classification Search ............... None
See application file for complete search history.

(56) References Cited

U.S. PATENT DOCUMENTS

| | | | | |
|---|---|---|---|---|
| 6,121,800 | A * | 9/2000 | Leighton et al. ........... 327/110 |
| 6,201,653 | B1 * | 3/2001 | Contreras et al. ............ 360/46 |
| 6,255,909 | B1 * | 7/2001 | Muza ........................ 330/264 |
| 6,307,695 | B1 * | 10/2001 | Bhandari ..................... 360/46 |
| 6,351,185 | B1 * | 2/2002 | Amrany et al. ............. 330/253 |
| 6,466,388 | B1 * | 10/2002 | Lacombe et al. ............ 360/68 |
| 6,501,334 | B1 * | 12/2002 | Corsi et al. ................. 330/267 |
| 6,512,646 | B1 * | 1/2003 | Leighton et al. ............. 360/46 |
| 6,593,769 | B1 * | 7/2003 | Rai .............................. 326/30 |
| 6,671,113 | B2 * | 12/2003 | Klaassen et al. ............. 360/46 |
| 6,683,487 | B2 * | 1/2004 | Takeuchi et al. ............ 327/423 |
| 6,879,455 | B2 * | 4/2005 | Ngo et al. .................... 360/68 |
| 6,917,484 | B2 * | 7/2005 | Ranmuthu .................. 360/46 |
| 6,927,933 | B2 * | 8/2005 | Choi et al. ................... 360/68 |
| 7,006,313 | B2 * | 2/2006 | Ngo ............................ 360/46 |
| 7,035,028 | B2 * | 4/2006 | Venca et al. ................. 360/46 |
| 7,068,454 | B2 * | 6/2006 | Kuehlwein et al. .......... 360/67 |
| 7,092,189 | B2 * | 8/2006 | Kuehlwein ................. 360/68 |
| 2003/0076613 | A1 * | 4/2003 | Ngo et al. .................... 360/68 |
| 2004/0120065 | A1 * | 6/2004 | Takeuchi ..................... 360/68 |

* cited by examiner

*Primary Examiner*—Andrea Wellington
*Assistant Examiner*—Dismery Mercedes
(74) *Attorney, Agent, or Firm*—W. James Brady, III; Frederick J. Telecky Jr.

(57) ABSTRACT

A write driver circuit (38) uses a matching resistors (R0, R1) to match the impedance of the head (32) disposed between output nodes (OUTP, OUTN). Control circuitry (Q4, Q5, Q6, Q7, R2, R4, R6 and R7) maintains the voltage at reference voltage nodes (VREFP, REFN) at essentially the same voltage as its corresponding output node. The matching resistor is disposed between the reference voltage node and the output node along with a driver (40a, 40b), which may be implemented as an AB driver. Since the voltage between the reference node and the output node is generally zero, very little current is shunted by the matching resistors, and thus, there is very little power wasted by the matching resistors. In the preferred embodiment, the output transistors of the AB drivers are driven by switched current sources (Q28 and Q29) to provide enhanced current to the bases of the output transistors on an as needed basis.

9 Claims, 6 Drawing Sheets

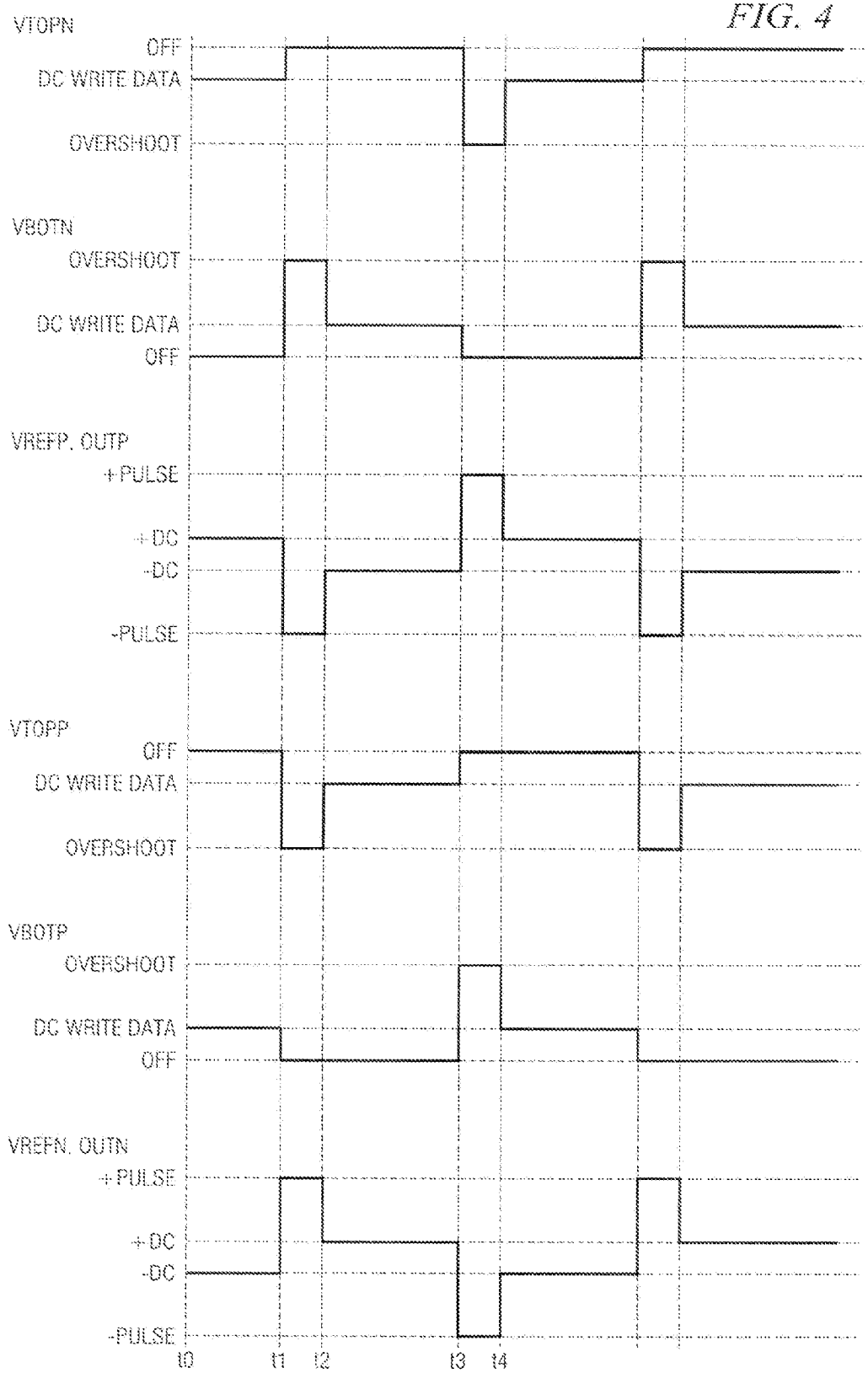

HIGH-SPEED, LOW POWER PREAMPLIFIER WRITE DRIVER

CROSS-REFERENCE TO RELATED APPLICATIONS

This application claims the benefit of the filing date of copending provisional application U.S. Ser. No. 60/515,508, filed Oct. 29, 2003, entitled "Power Efficient AB Driver For Use in Disk Drive Preamplifier Write Drivers".

STATEMENT OF FEDERALLY SPONSORED RESEARCH OR DEVELOPMENT

Not Applicable

BACKGROUND OF THE INVENTION

1. Technical Field

This invention relates in general to disk storage devices and, more particularly, to a high speed preamplifier/write driver.

2. Description of the Related Art

Almost all business and home computers use a hard disk drive storage system for mass storage requirements. A hard disk drive stores data by individually modifying the magnetic orientation of small regions of a disk surface. As shown in FIG. 1, a hard disk drive 10 typically includes one or more rotating disks 12. A head assembly 14 associated with each surface of the disks 12 typically includes separate read and write heads for reading data from the disk and writing data to the disk. The write head is essentially a small coil of wire which stores data by magnetizing small regions along a disk's tracks. A current driven through the write head in a first direction magnetizes a small region of the disk under the head at a first orientation and a current driven through the write head in the opposite direction magnetizes a small region of the disk under the head at a second orientation. The read head distinguishes the magnetic orientation of each bit location to derive logical "1s" and "0s".

The circuit which drives the write head is referred to as a "write driver", which is part of the read/write preamplifier 16. The write driver controls the direction of the flow of current through the head, responsive to information from the channel circuitry 18. The channel circuitry receives data from the hard drive controller 20 of the computer 22. The computer 22 further includes processing circuitry and other components (not shown).

A recent requirement from disk drive manufacturers is that the preamplifier write driver provides a symmetric write driver signal for reduced noise coupling. A symmetric write driver must have equal and opposite positive and negative write driver signals over all frequency data patterns. These write driver signals must be symmetric in amplitude as well as transient behavior. If the positive and negative write driver signals are well matched in amplitude and transient behavior, the write driver will have virtually no common-mode signal component. The requirement of a symmetrical write driver is driven by read head reliability as the new generation of magneto-resistive (MR) heads is much more sensitive to capacitive coupling from the write driver. Non-symmetrical write drivers with large common-mode voltage components can capacitively couple damaging voltage levels, both differentially and single-ended, to the read head. Generally symmetrical write drivers have been developed to address this problem.

Write drivers drive the write head differentially to achieve the maximum voltage possible across the write head for both positive and negative transitions. The requirement of driving the write head differentially means that both sides of the write driver must have bi-directional drive capability.

FIGS. 2a and 2b illustrate examples of typical prior art current-mode write drivers. Unlike voltage-mode write drivers, where an impedance match resistor can be placed in series with the low impedance output of the voltage drive device, current-mode write drivers must place the impedance match resistor in parallel with the high-impedance output of the current drive device. Traditionally, in symmetrical write drivers (with the common-mode output voltage kept near ground), the impedance match resistor has been placed either from each output node to ground through a capacitor or across the output nodes through a capacitor. The purpose of the capacitor is to prevent DC current from being stolen by the impedance match resistors.

These methods have two main drawbacks. First, a large amount of current is shunted away from the inductive write head load (connected between the output nodes) through the low-valued impedance match resistors during the overshoot or pulsing time period when the output voltages can swing near rail to rail (−5 v to +5 v). This current is essentially wasted since it is not being delivered to the write head, which increases power dissipation without increasing performance. Secondly, the capacitor must be sized somewhat large to realize a low impedance at frequencies of interest and provide effective impedance matching. This capacitance, along with the impedance match resistance, creates an RC pole that lies well within the write data frequency range. Thus, settling is not achieved. The corresponding RC decay adversely affects the write current waveshape and hurts performance. The capacitor therefore limits the maximum frequency of the write driver.

In FIG. 2a, the output ports OUTP and OUTN drive the inductive write head load 32. OUTP and OUTN are driven by the output devices Q0, Q1, Q2 and Q3. The symmetrical nature of an NPN differential pair (Q2–Q3) balanced by a PNP differential pair (Q0–Q1) provides the ability to keep the common-mode output voltage around ground over a high frequency pattern. Q0–Q3 are driven by the differential write data input voltages VTOPN, VTOPP, VBOTN, VBOTP. If VTOPP is at a lower potential than VTOPN and VBOTN is at a higher potential than VBOTP, then PNP transistor Q1 and NPN transistor Q2 will conduct, while PNP transistors Q0 and NPN transistor Q3 will not conduct. Accordingly, a current path is established from Vcc to Vee (as shown by the dotted line) through R5, Q1, head 32, Q2 and R3. Similarly, If VTOPN is at a lower potential than VTOPP and VBOTP is at a higher potential than VBOTN, then PNP transistor Q0 and NPN transistor Q3 will conduct, while PNP transistors Q1 and NPN transistor Q2 will not conduct. Accordingly, a current path is established from Vcc to Vee in the opposite direction through head 32. The write driver of FIG. 2b works in a similar fashion; the difference between the circuits of FIGS. 2a and 2b concerns the manner in which impedance matching is performed.

In FIG. 2a, impedance matching is provided by the impedance match resistors R0 and R1 (both having a value equal to half of the matching resistance) along with C0 and C1. In FIG. 2b, impedance matching is provided by the impedance match resistors R20 and R21 (both having a value equal to half of the matching resistance) along with C4. The DC voltage of both OUTP and OUTN, as well as the AC common-mode output voltage, is set around ground by R14 and R15 in FIG. 2a and by R16 and R17 in FIG. 2b. The value of these resistors is large compared to the impedance match resistors.

As mentioned above, the output voltages OUTP and OUTN can swing near rail to rail (−5 v to +5 v). Typical impedance match resistors are valued around 70 ohms differential. As an example, a differential output voltage swing of 8 v (which allows headroom for circuitry) during the overshoot phase placed across a differential match resistance of 70 ohms shunts 114 mA away from the write head load through the match resistors. This large amount of wasted current significantly increases power dissipation without any increase in performance.

Accordingly, a need has arisen for a balanced current-mode write driver with improved power efficiency and without an RC pole that limits the speed of the device.

BRIEF SUMMARY OF THE INVENTION

In the present invention, a hard disk storage system comprises a magnetic disk, a head for writing data to the disk and a preamplifier for orienting a current through the head in a desired direction responsive to a data signal. The preamplifier comprises circuitry coupled across the head at first and second output nodes to provide a current path through the head in a direction responsive to the data signal, a first matching resistor coupled between a first reference node and the first output node and a second matching resistor coupled between a second reference node and the second output node. Control circuitry maintains the voltage of the first reference node at substantially the same voltage as the first output node and maintains the voltage of the second reference node at substantially the same voltage as the second output node.

Because the matching resistors are coupled between nodes at substantially the same voltage, the amount of power dissipated to impedance match the outputs of the write driver is substantially reduced. Further, since no capacitors are needed, the impedance matching is DC coupled and there is no RC pole and corresponding settling issue as in the prior art. Thus, better performance is obtained with less power wasted.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 4 is a timing diagram showing the operation of the write driver of FIG. 3;

DETAILED DESCRIPTION OF THE INVENTION

The present invention is best understood in relation to FIGS. 3–7 of the drawings, like numerals being used for like elements of the various drawings.

Figure 1:
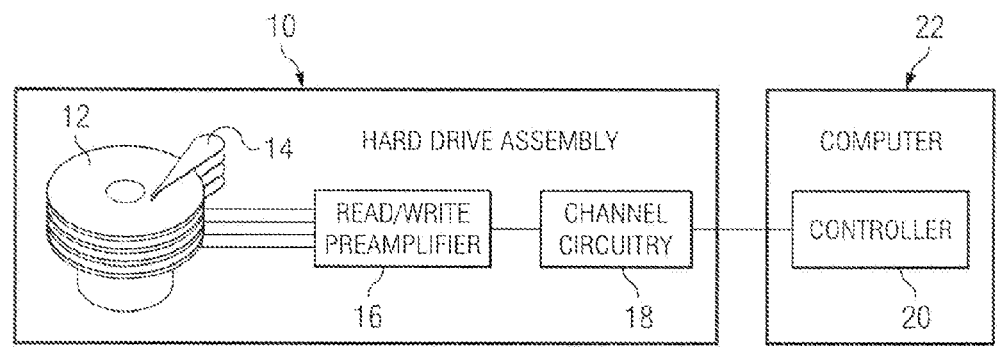
FIG. 1 illustrates a hard drive system coupled to a computer.
Figure 2A:
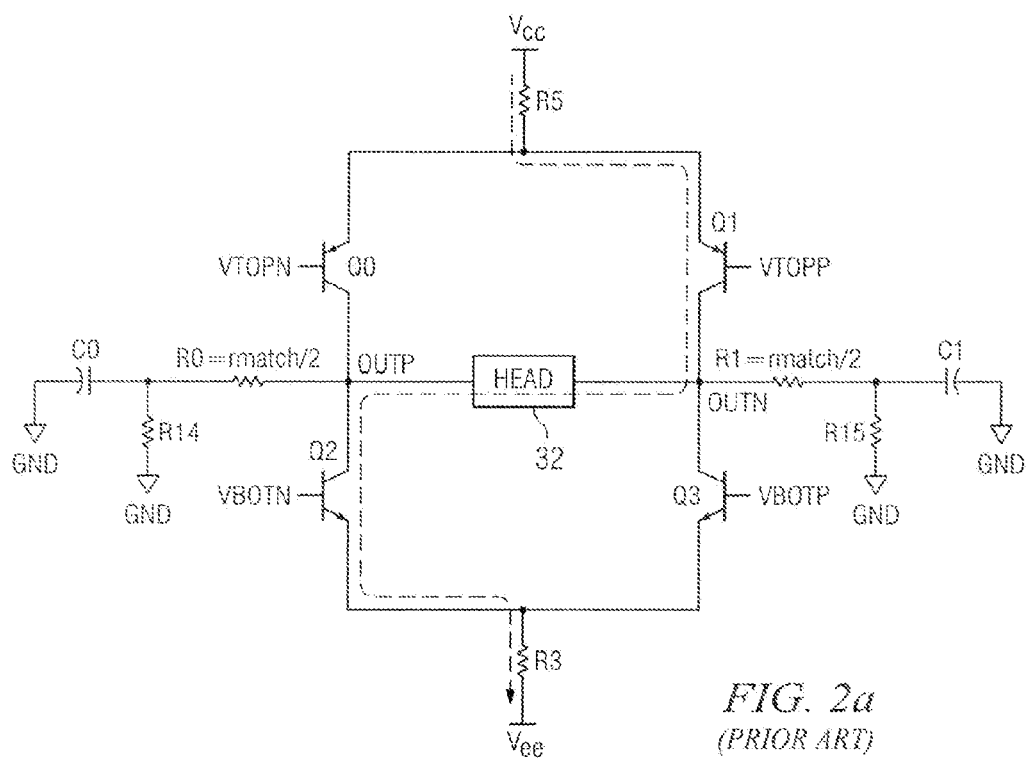
FIGS. 2a and 2b illustrate prior art write drivers used in the preamplifier of the hard drive system of FIG. 1.
Figure 2B:
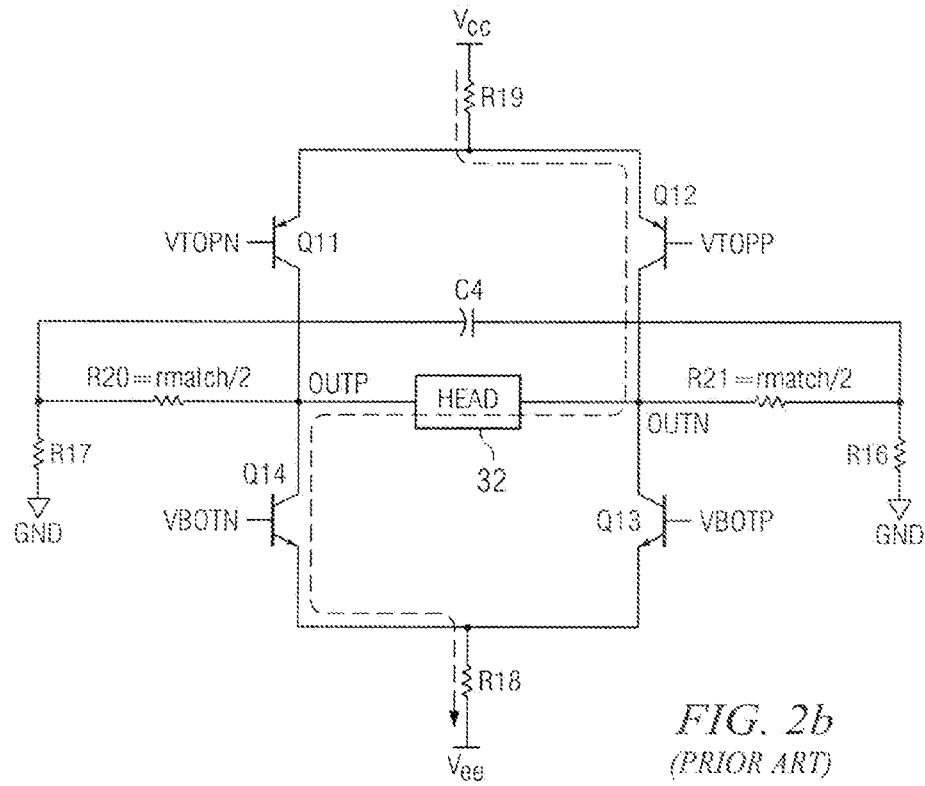
Figure 3:
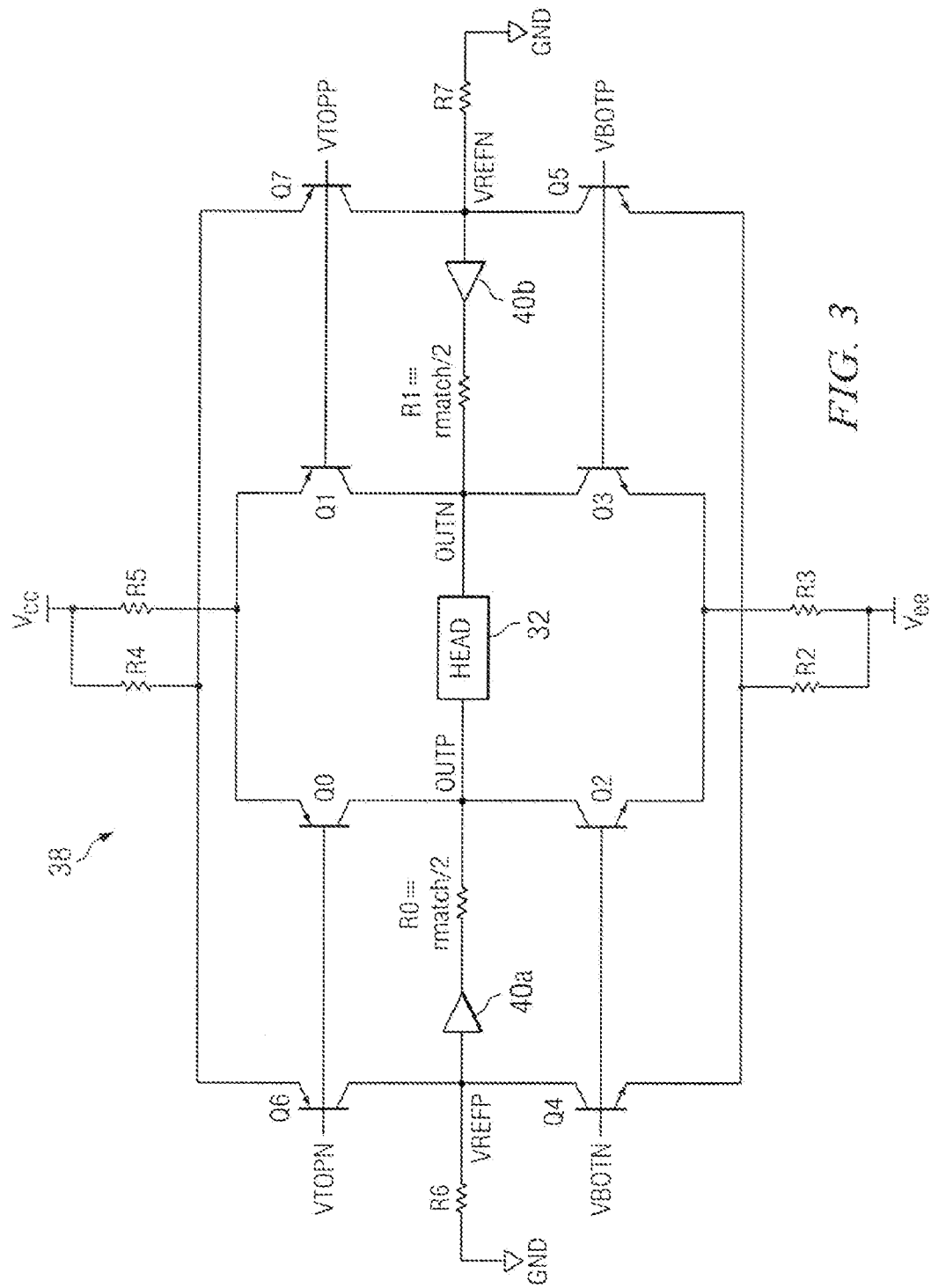
FIG. 3 is a schematic representation of an improved write driver.

FIG. 3 illustrates a schematic representation of a write driver circuit 38 with low power dissipation which eliminates the need for a capacitor. For purposes of illustration, components with a similar function to those shown in FIG. 2a are labeled with the same reference. Thus, the core output structure of the output devices Q0–Q3 (with R3, R5) and the impedance match resistors R0 and R1 can be the same as in the prior art. Also, the input write data voltages and output nodes can remain the same.

The embodiment of FIG. 3 adds control circuitry provided by transistors Q4, Q5, Q6 and Q7 (with R2, R4), reference resistors R6, R7, and low output impedance drivers 40a and 40b, which minimizes the current through the matching resistors R0 and R1 and eliminates the need for a capacitor. Q6 and Q7 are PNP transistors, each having an emitter coupled to $V_{CC}$ through resistor R4. The base of Q6 is coupled to VTOPN and the base of Q7 is coupled to VTOPP. The collector of Q6 is coupled to the input of driver 40a (node VREFP) and the collector of Q7 is coupled to the input of driver 40b (node VREFN). The collector of NPN transistor Q4 is coupled to the input of driver 40a and the collector of NPN transistor Q5 is coupled to the input of driver 40b. The base of Q4 is coupled to VBOTN and the base of Q5 is coupled to VBOTP. The emitters of Q4 and Q5 are coupled to $V_{ee}$ through R2. R6 is coupled between the input of driver 40a and ground and R7 is coupled between the input of driver 40b and ground. The output of driver 40 is coupled to R0 and the output of driver 40b is coupled to R1. The opposite side of R0 and R1 are the OUTP and OUTN signals, respectively.

Figure 6:
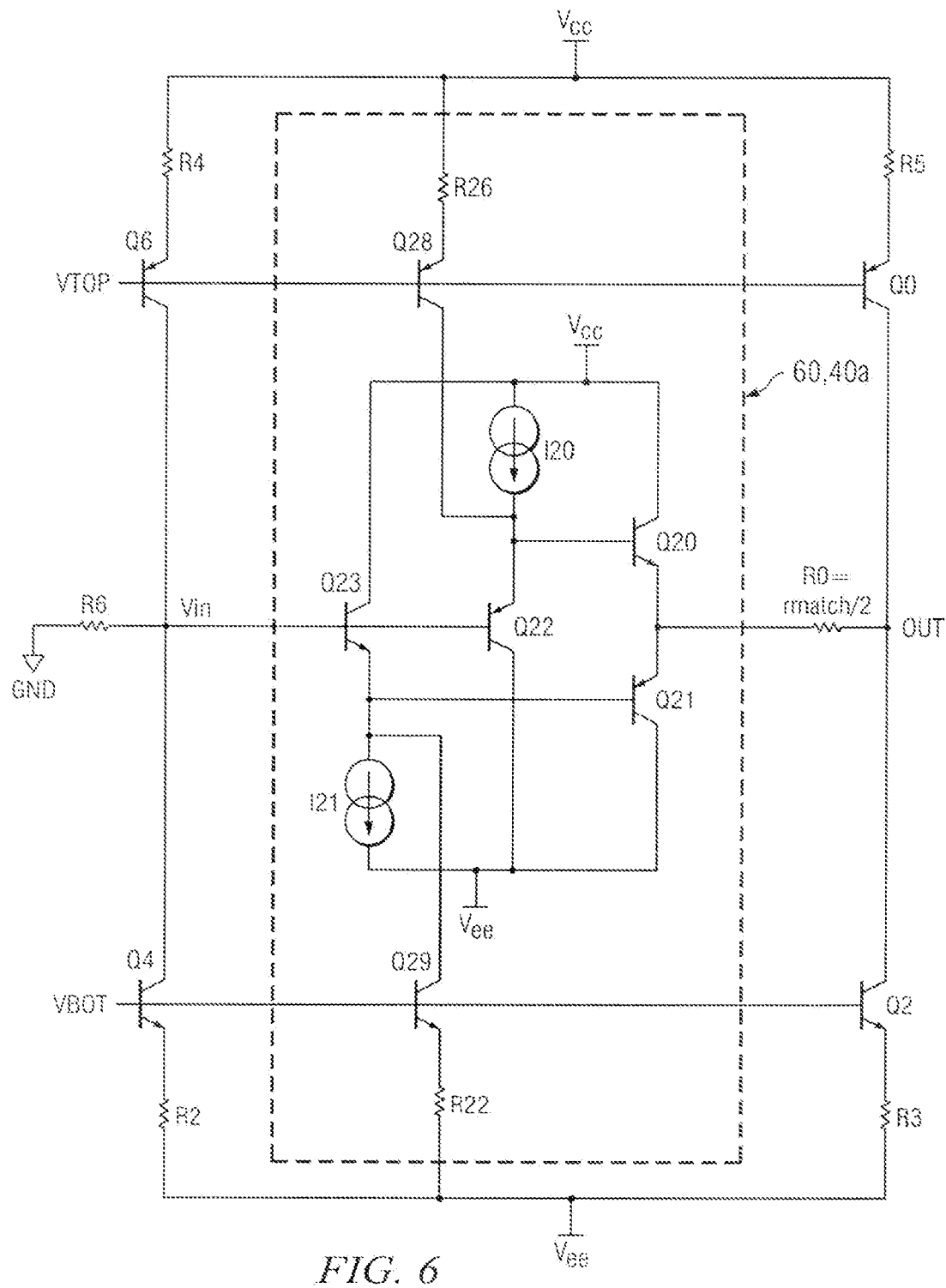
FIG. 6 illustrates an improved AB driver for use in the circuit of FIG. 3.
Figure 7:
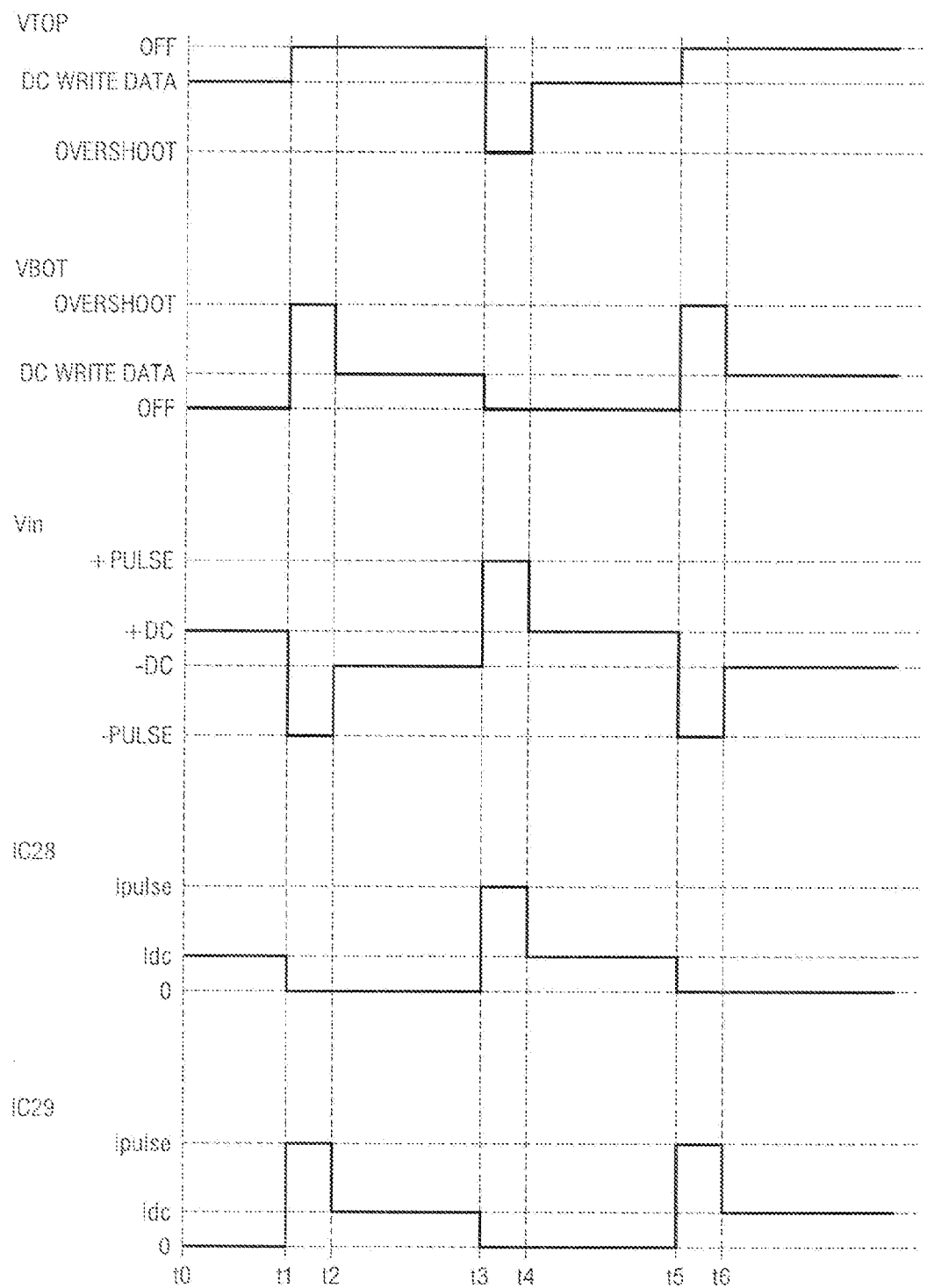
FIG. 7 is a timing diagram illustrating the operation of the AB driver of FIG. 6.

The low output impedance drivers 40a and 40b can be realized in a number of ways, one example being a class AB driver. A preferred embodiment of a class AB driver is shown in FIGS. 6 and 7. The currents through Q4, Q5, Q6 and Q7 automatically track the output currents through Q2, Q3, Q0 and Q1, respectively, by virtue of the connections shown. Specifically, looking at one pair of these transistors, since the bases of Q0 and Q6 are driven by the same voltage (VTOPN) and since both have emitter degeneration to $V_{CC}$, their currents will track and follow each other in whatever ratio is specified. Q6 and Q4 drive reference resistor R6, generating reference voltage VREFP at the input of driver 40a. Q7 and Q5 drive reference resistor R7, generating reference voltage VREFN at the input to driver 40b. Reference resistors R6 and R7 are tied to ground, which sets the DC voltage of VREFP and VREFN around ground as well as the AC common-mode voltage of (VREFP+VREFN)/2. The reference voltages VREFP and VREFN are applied to the inputs of the low-impedance drivers, which drive R0 and R1. This ultimately sets the DC voltage of OUTP and OUTN around ground as well as the AC common-mode voltage of (OUTP+OUTN)/2.

By driving the impedance match resistors R0 and R1 in this fashion, the drawbacks of prior art are overcome. Besides driving the impedance match resistors R0 and R1 at a low output impedance to keep match at all times, the purpose of the drivers 40a and 40b is to minimize the amount of current through the impedance match resistors R0 and R1. This is achieved by having the output of each driver 40a or 40b track or follow its respective output node OUTP or OUTN. The low-impedance drivers are driven by the internal nodes VREFP and VREFN, which mimic the behavior of the output voltages OUTP and OUTN, respectively. With both ends of each impedance match resistor near the same voltage, the amount of current shunted away from the write head load through the impedance match resistors R0 and R1 during the overshoot phase is minimized. While generating the input voltages for the drivers dissipates power, as well as operating the drivers themselves, circuit methods are utilized to reduce the power spent in this area. For example, the currents from Q4–Q7 are set smaller than the output currents from Q0–Q3, while the reference resistors R6 and R7 are sized larger than the impedance match resistors R0 and R1 for optimal transient performance. In addition, low-power techniques can be employed in the driver circuitry, as described in connection with FIGS. 6 and 7. Overall, the amount of power dissipated to impedance match the outputs of the write driver is substantially reduced from the prior art. Also, since there are no capacitors in the new art, the impedance matching is DC coupled and there is no RC pole and corresponding settling issue as in the prior art. Thus, the circuit of FIG. 3 achieves better performance with less power.

A detailed analysis of the operation of the circuit of FIG. 3 is provided in conjunction with the timing diagram in FIG. 4. The input write data voltages VTOPP, VTOPN, VBOTP, and VBOTN are conditioned to have 3 states: off, pulse (overshoot), and settled (DC write data). These input write data voltages are all synchronized to transition at the same point in time by circuitry not shown here.

At time=t0, VTOPN and VBOTP are in the settled DC write data state, while VBOTN and VTOPP are in the off state. Thus Q6 is supplying current to R6, Q5 is supplying current to R7, Q0 is supplying current to OUTP, and Q3 is supplying current to OUTN. Q4, Q2, Q1, and Q7 are off. While these currents put a small DC component on VREFP, VREFN, OUTP, and OUTN, these voltages are still near ground.

At time=t1, all of the input write data voltages switch polarity. VTOPN and VBOTP switch to the off state (thus, Q6, Q0, Q3, Q5 turn off). Both VBOTN and VTOPP enter the overshoot or pulsed phase. During this overshoot phase, Q4, Q2, Q1, and Q7 each output a pulse of high current which drives VREFP and OUTP low and VREFN and OUTN high. It is during this transition that the output voltages OUTP and OUTN can swing near the rails. OUTP goes from around GND to near −5 v and OUTN goes from around GND to near +5 v. As described earlier, this is the large differential voltage that shunts a large amount of current away from the write head when placed across the differential impedance match resistance in the prior art. This drawback of prior art is overcome with the new art as VREFP tracks OUTP and VREFN tracks OUTN as indicated in FIG. 4. Thus, the differential voltage placed across each impedance match resistor R0 and R1 is minimized, as is the current R0 and R1 shunt away from the write head. Note that the AC overshoot pulse of OUTP and OUTN are equal and opposite, thus keeping the common-mode voltage of (OUTP+OUTN)/2 near ground.

At time=t2, the circuit enters a settled state. VTOPN and VBOTP are still in an off state, so Q6, Q0, Q3, and Q5 remain off. VBOTN and VTOPP enter their settled DC write data state. Q4 is supplying current to R6, Q7 is supplying current to R7, Q2 is supplying current to OUTP, and Q1 is supplying current to OUTN. While these currents put a small DC component on VREFP, VREFN, OUTP, and OUTN, these voltages are still near ground.

At time=t3, the input write data voltages switch polarity again. VBOTN and VTOPP switch to an off state (Q4, Q2, Q1, Q7 turn off). VTOPN and VBOTP enter the overshoot or pulsed phase. During this overshoot phase, Q6, Q0, Q3, and Q5 each output a pulse of high current which drives VREFP and OUTP high and VREFN and OUTN low. OUTP goes from around ground to near +5 v and OUTN goes from around ground to near −5 v. The same benefits and improvements over prior art described with regard to time=t1 apply to this state as well.

At time=t4, the circuit once again enters a settled state and is back to the original state described in time=t0.

The drivers 40a–b shown in FIG. 3 can be implemented using an AB driver. However, AB drivers used in disk drive preamplifier write drivers require large currents to handle the near rail to rail voltage swings at current day data rates in excess of 2 Gb/s. Specifically, the input stage needs large bias currents to supply the large transient base currents that the output stage requires during fast slewing of the large output voltage swing. Traditional AB drivers supply this input stage bias current with large fixed DC currents. This generates high power dissipation, which is a critical parameter for preamplifier write drivers and must be minimized.

Figure 5:
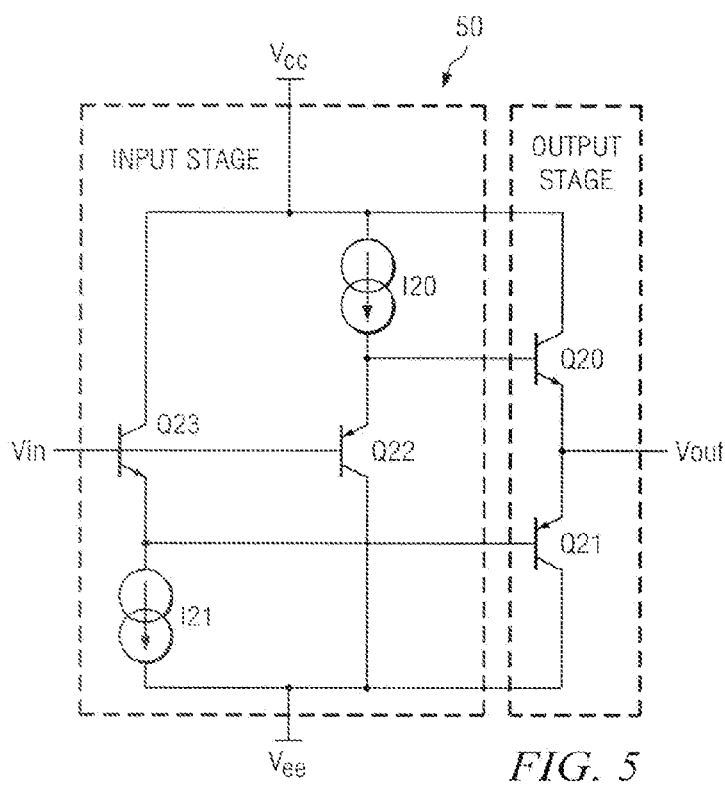
FIG. 5 is a schematic representation of prior art AB driver.

FIG. 5 shows a schematic representation of a prior art AB driver circuit 50. The input stage comprises transistors Q22 and Q23, and current sources I20 and I21. The output stage comprises Q20 and Q21. Q23 and Q22 have bases coupled to Vin. The collector of NPN transistor Q23 is coupled to $V_{CC}$. Current source I21 is coupled between the emitter of Q23 and $V_{ee}$. The collector of PNP transistor Q22 is coupled to $V_{ee}$. Current source I20 is coupled between $V_{CC}$ and the emitter of transistor Q22. The base of NPN transistor Q20 is coupled to the emitter of Q22 and the base of PNP transistor Q21 is coupled to the emitter of Q23. The emitters of Q20 and Q21 are coupled together at the output node, Vout. The collector of Q20 is coupled to $V_{CC}$ and the collector of Q21 is coupled to $V_{ee}$.

The input stage sets up the bias for the output stage and drives the output stage. In the application of preamplifier write drivers disclosed herein, the output (Vout) of the AB driver 50 is used to drive a resistor (R0 or R1) that impedance matches the transmission line to the inductive write head 32. The fixed DC bias current sources mentioned above are I20 and I21. If these currents are too small and do not provide sufficient drive to handle the base currents of the output devices Q20 and Q21, then the output devices Q20 and Q21 will turn off. This in turn causes loss of impedance match, which will degrade performance of the write driver. To prevent the output devices Q20 and Q21 from turning off, the DC currents for I20 and I21 must be sized large to ensure proper operation during the worst case scenario (i.e., where Vout—either OUTN or OUTP—is pulsed), which generates high power dissipation and is the drawback of the prior art.

FIG. 6 illustrates a schematic representation of an improved AB driver 60, as used in the write driver of FIG. 3 (for purposes of illustration, only the left side of the write driver of FIG. 3 is shown). The output node of the write driver is labeled OUT and swings near rail to rail voltage (+5 v, −5 v). This node is driven by the output devices Q2 and Q0, along with the impedance match resistor R0. The purpose of the AB driver 60 is to drive the impedance match resistor R0 and keep match at all times while minimizing the amount of current through R0. As described in connection with FIG. 3, this is achieved by having the output of the AB driver track or follow the output node. The AB driver 60 adds Q28, R26, Q29, and R22 to the prior art AB driver 50. R26 is coupled between $V_{CC}$ and the emitter of PNP transistor Q28. The collector of Q28 is coupled to the emitter of Q22. The base of Q28 is driven by VTOP (VTOPN for driver 40*a* and VTOPP for driver 40*b*). R22 is coupled between $V_{ee}$ and the emitter of NPN transistor Q29. The collector of Q29 is coupled to the emitter of Q23. The base of Q29 is driven by VBOT (VBOTN for driver 40*a* and VBOTP for driver 40*b*).

Q28 and Q29 inject transient or pulsed currents into the input stage (at the emitters of Q22 and Q23, respectively) to supply the additional base current to the output devices Q20 and Q21 as needed when VTOP or VBOT are pulsed (resulting in OUT being pulsed). This enables the fixed DC currents I20 and I21 to be reduced significantly (to a level needed to supply base current to keep the output devices turned on when VTOP of VBOT, and hence OUT, is settled) and lowers the overall RMS or average power dissipation without sacrificing any performance. It should be noted that for some applications, the bias current I20 and I21 could be removed altogether depending upon the DC current level of Q28 and Q29.

For this application, there is a time period when there is no current out of Q28 and Q29 and thus I20 and I21 are still utilized, albeit at a much lower DC current which enables the power savings at issue. One important point to make is that the transient or pulsed currents from Q28 and Q29 are synchronized in time with the input voltage Vin so that the pulse currents occur exactly when needed without any delay, which is necessary for operation at 2 Gb/s+(see timing diagram in FIG. 7). This is achieved by having these pulsed current sources derived from the same source that drives the input of the AB driver. In other words, this is achieved by having both Q4 and Q29 (or Q6 and Q28) driven by the same signal VBOT (or VTOP). Attempting to use feedback from the output devices Q20 and Q21 to supply the base current would be too slow to function well at 2 Gb/s+ due to the inherent delay of the feedback circuitry. This entire circuitry is driven by the write data voltage signals VTOP and VBOT, the timing of which is shown in FIG. 7.

A detailed analysis of operation of the circuit of FIG. 6 is given in conjunction with the timing diagram of FIG. 7. As in the case of FIG. 4, the input write data voltages are conditioned to have 3 states: off, pulse (overshoot), and settled (DC write data).

At time=t0, VTOP is at settled DC write data and VBOT is off. Thus Q6 is supplying current to R4, Q28 is supplying a low DC current to AB driver input device Q22, and Q0 is supplying current to the output node (OUT). Q4, Q29, and Q2 are off. The AB driver 60 is in a settled state and the input stage does not require a high bias current to handle the output stage base current.

At time=t1, the input write data voltages VTOP and VBOT switch polarity. VTOP turns off (Q6, Q28 and Q0 turn off) and VBOT enters the overshoot or pulsed phase. It is during this transition that the output voltage OUT swings from around ground to near −5 v (see Vin in FIG. 7). If operating at continuous data transitions (i.e., no settling allowed to occur), this voltage swing could be from near rail to rail (+5 v to −5 v) and the output of the AB driver 60 must keep up to minimize power dissipation in R0. Swinging this much voltage with a fast risetime requires high current through Q21, which in turn requires a high Q21 base current. Because Q29 is driven by VBOT, the bias current from Q29 is pulsed at exactly the same time that Q21 requires the additional base current (as well as current to charge the capacitance at that node). The amount of current supplied by Q29 at the peak of its pulse is about the value the prior art AB driver 50 needs to set for its fixed DC current sources (I20 and I21). However, the large pulsed current provided by Q29 only remains there for a short time, then drops to a much lower settled level, as VBOT transitions from overshoot to settled. Because it is synchronized with the AB driver input voltage Vin, Q29 provides high current only during the time it is needed and then reduces to a lower current when high current is not needed (see IC29 in FIG. 7). This reduces the overall average bias current for the input stage and enables power savings without sacrificing performance.

At time=t2, the circuit enters a settled state. VTOP is still off and VBOT is now in its settled DC write data state. Q4 is supplying current to R4, Q29 is supplying a low DC current to AB driver input device Q23, and Q2 is supplying current to the output node. Q6, Q28, and Q0 are still off. Since the AB driver 60 is in a settled state, the input stage does not need a high bias current to handle the output stage base current.

At time=t3, the input write data voltages VTOP and VBOT switch polarity again. VBOT turns off and VTOP enters the overshoot or pulsed phase. The output voltage swings from around ground to +5 v (or at continuous data transitions from −5 v to +5 v) and the output of the AB driver 60 follows. This requires a high current through Q20, which in turn requires a high Q20 base current. This is provided by pulsed current source Q28 in the exact same manner as described for Q29 in the time=t1 paragraph above (see IC28 in FIG. 7), yielding the same benefits and improvements over prior art.

At time=t4, the circuit once again enters a settled state and is back to the original state described in time=t0.

Accordingly, transistors Q28 and Q29 act as switched current sources to provide current to the bases of AB drive output transistors Q20 and Q21, respectively, at the exact times that the additional current is needed at one of the output transistors and switch to either an off or a settled state when the high currents are no longer needed to drive the output transistors. Hence, the high current needed for data transitions on an as needed basis, greatly saving power.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A hard disk storage system, comprising:
   (a) a magnetic disk;
   (b) a head for writing data to said disk; and
   (c) a preamplifier for orienting a current through said head in a desired direction responsive to a data signal, said preamplifier comprising:
      (i) first and second output ports for coupling to said head;
      (ii) first, second, third, and fourth output devices for driving a current through said head, said first and third output devices connected to said first output port, and said second and fourth output devices connected to said second output port;
      (iii) a first matching resistor coupled between a first reference node and said first output port;
      (iv) a second matching resistor coupled between a second reference node and said second output port; and
      (v) control circuitry for maintaining the voltage of said first reference node at substantially the same voltage as said first output port and for maintaining the voltage of said second reference node at substantially the same voltage as said second output port.
(d) whereby current through said first and second matching resistors can be minimized.

2. The hard disk storage system of claim 1, wherein said control circuitry includes first and second low-output-impedance drivers, said first low-output-impedance driver connected between said first reference node and said first matching resistor remote from said first output port, and said second low-output-impedance driver connected between said second reference node and said second matching resistor remote from said second output port.

3. The hard disk storage system of claim 2, wherein said control circuitry includes
(i) first and second reference resistors, said first reference resistor connected between said first reference node and ground, and said second reference resistor connected between said second reference node and ground; and
(ii) first, second, third, and fourth transistors, said first and third transistors connected to said first reference node, and said second and fourth transistors connected to said second reference node, and further where said first transistor tracks said first output device, said second transistor tracks said second output device, said third transistor tracks said third output device, and said fourth transistor tracks said fourth output device.

4. A preamplifier for controlling the direction of current through a head of a hard disk drive assembly, comprising:
(i) first and second output ports for coupling to said head;
(ii) first, second, third, and fourth output devices for driving a current through said head, said first and third output devices connected to said first output port, and said second and fourth output devices connected to said second output port;
(iii) a first matching resistor coupled between a first reference node and said first output port;
(iv) a second matching resistor coupled between a second reference node and said second output port; and
(v) control circuitry for maintaining the voltage of said first reference node at substantially the same voltage as said first output port and for maintaining the voltage of said second reference node at substantially the same voltage as said second output port; whereby current through said first and second matching resistors can be minimized.

5. The preamplifier of claim 4, wherein said control circuitry includes first and second low-output-impedance drivers, said first low-output-impedance driver connected between said first reference node and said first matching resistor remote from said first output port, and said second low-output-impedance driver connected between said second reference node and said second matching resistor remote from said second output port.

6. The preamplifier of claim 5, wherein said control circuitry includes
(i) first and second reference resistors, said first reference resistor connected between said first reference node and ground, and said second reference resistor connected between said second reference node and ground; and
(ii) first, second, third, and fourth transistors, said first and third transistors connected to said first reference node, and said second and fourth transistors connected to said second reference node, and further where said first transistor tracks said first output device, said second transistor tracks said second output device, said third transistor tracks said third output device, and said fourth transistor tracks said fourth output device.

7. A method of controlling the direction of current through a head of a hard disk drive assembly coupled between first and second output ports, comprising the steps of:
(a) controlling the direction of a current path through the head coupled between first and second output ports responsive to a data signal applied to first, second, third, and fourth output devices with said first and third output devices connected to said first output port, and with said second and fourth output devices connected to said second output port;
(b) providing a first matching resistor coupled between a first reference node and said first output port;
(c) providing a second matching resistor coupled between a second reference node and said second output port;
(d) maintaining the voltage of said first reference node at substantially the same voltage as said first output port and maintaining the voltage of said second reference node at substantially the same voltage as said second output port.

8. The method of claim 7, wherein said maintaining includes providing first and second AB class low impedance drivers coupled in series with the first and second matching resistors between the respective reference node and output port.

9. A computing device, comprising:
(a) processing circuitry; and
(b) a hard drive assembly coupled to said processing circuitry and including:
(i) a magnetic disk;
(ii) a head for writing data to said disk; and
(iii) a preamplifier for orienting a current through said head in a desired direction responsive to a data signal, said preamplifier comprising:
(A) first and second output ports for coupling to said head;
(B) first, second, third, and fourth output devices for driving a current through said head, said first and third output devices connected to said first output port, and said second and fourth output devices connected to said second output port;
(C) a first matching resistor coupled between a first reference node and said first output port;
(D) a second matching resistor coupled between a second reference node and said second output port; and
(E) control circuitry for maintaining the voltage of said first reference node at substantially the same voltage as said first output port and for maintaining the voltage of said second reference node at substantially the same voltage as said second output port.

* * * * *